United States Patent [19]

Shabrang et al.

[11] Patent Number: 5,644,421
[45] Date of Patent: Jul. 1, 1997

[54] IRIDIUM OXIDE COUNTERELECTRODE FOR ELECTROCHROMIC DEVICES

[75] Inventors: Mani Shabrang; Susan J. Babinec; Richard D. Varjian, all of Midland, Mich.

[73] Assignee: The Dow Chemical Company, Midland, Mich.

[21] Appl. No.: 377,558

[22] Filed: Jan. 24, 1995

Related U.S. Application Data

[63] Continuation-in-part of Ser. No. 146,768, Nov. 2, 1993, abandoned.

[51] Int. Cl.⁶ .................................................. G02F 1/153
[52] U.S. Cl. .................................. 359/269; 359/271
[58] Field of Search ........................ 359/271, 269

[56] References Cited

U.S. PATENT DOCUMENTS 5,457,564  10/1995  Leventis et al. .................... 359/271

Primary Examiner—Georgia Y. Epps
Assistant Examiner—Thomas Robbins
Attorney, Agent, or Firm—Timothy S. Stevens

[57] ABSTRACT

An improved electrochromic device of the type having an electrochromic electrode in contact with an ion conductor, the ion conductor in turn being in contact with a layer of gold. The improvement of the instant invention is to interpose a layer of iridium oxide between the ion conductor and the layer of gold wherein the layer of iridium oxide and the layer of gold do not form an electrochromic electrode.

7 Claims, 1 Drawing Sheet

IRIDIUM OXIDE COUNTERELECTRODE FOR ELECTROCHROMIC DEVICES

This application is a continuation-in-part of application Ser. No. 08/146,768 filed Nov. 2, 1993, now abandoned.

BACKGROUND

Electrochromic devices reflect, absorb or transmit a controllable amount of light in response to an input of electric current to the device. Electrochromic devices have a wide range of applications, e.g., a variably tintable window for an automobile or building. Many electrochromic devices include an electrochromic electrode, an ion conductor and a counterelectrode.

Iridium oxide can be used in the electrochromic electrode or the counterelectrode of an electrochromic device as disclosed in U.S. Pat. No. 4,258,984 to Beni et al.

A preferred electrochromic device of U.S. Pat. No. 5,124,080 to Shabrang and Babinec comprised a layered structure as follows: (1) a panel of glass; (2) a layer of indium tin oxide upon the panel of glass; (3) a layer of tungsten oxide upon the layer of indium tin oxide; (4) a layer of perfluorosulfonic acid polymer upon the layer of tungsten oxide; and (5) a layer of gold upon the layer of perfluorosulfonic acid polymer. The layer of tungsten oxide and the layer of indium tin oxide form the electrochromic electrode. The layer of perfluorosulfonic acid polymer is the ion conductor. The layer of gold is the counterelectrode.

The above described electrochromic devices performed well, especially when operated in a humidified inert gas environment as disclosed in U.S. Pat. No. 5,136,419 to Shabrang. For example, such electrochromic devices have operated for tens of thousands of cycles. However, when the size of such devices was increased from square inch dimensions to square foot dimensions, then an unforeseen problem arose with the gold layer. The problem was the apparent failure of the gold layer after less than one thousand cycles.

SUMMARY OF THE INVENTION

The primary benefit of the instant invention is a solution to the above mentioned problem with the gold layer. The instant invention is an improvement to the above mentioned type of device, i.e., a device that comprises an electrochromic electrode, an ion conductor, and a counterelectrode, the counterelectrode comprising a layer of gold. The improvement of the instant invention is the addition of a layer of iridium oxide. The layer of iridium oxide is positioned between the layer of gold and the ion conductor. In addition, the layer of iridium oxide and the layer of gold must not form an electrochromic electrode.

DETAILED DESCRIPTION OF THE INVENTION

Figure 1:
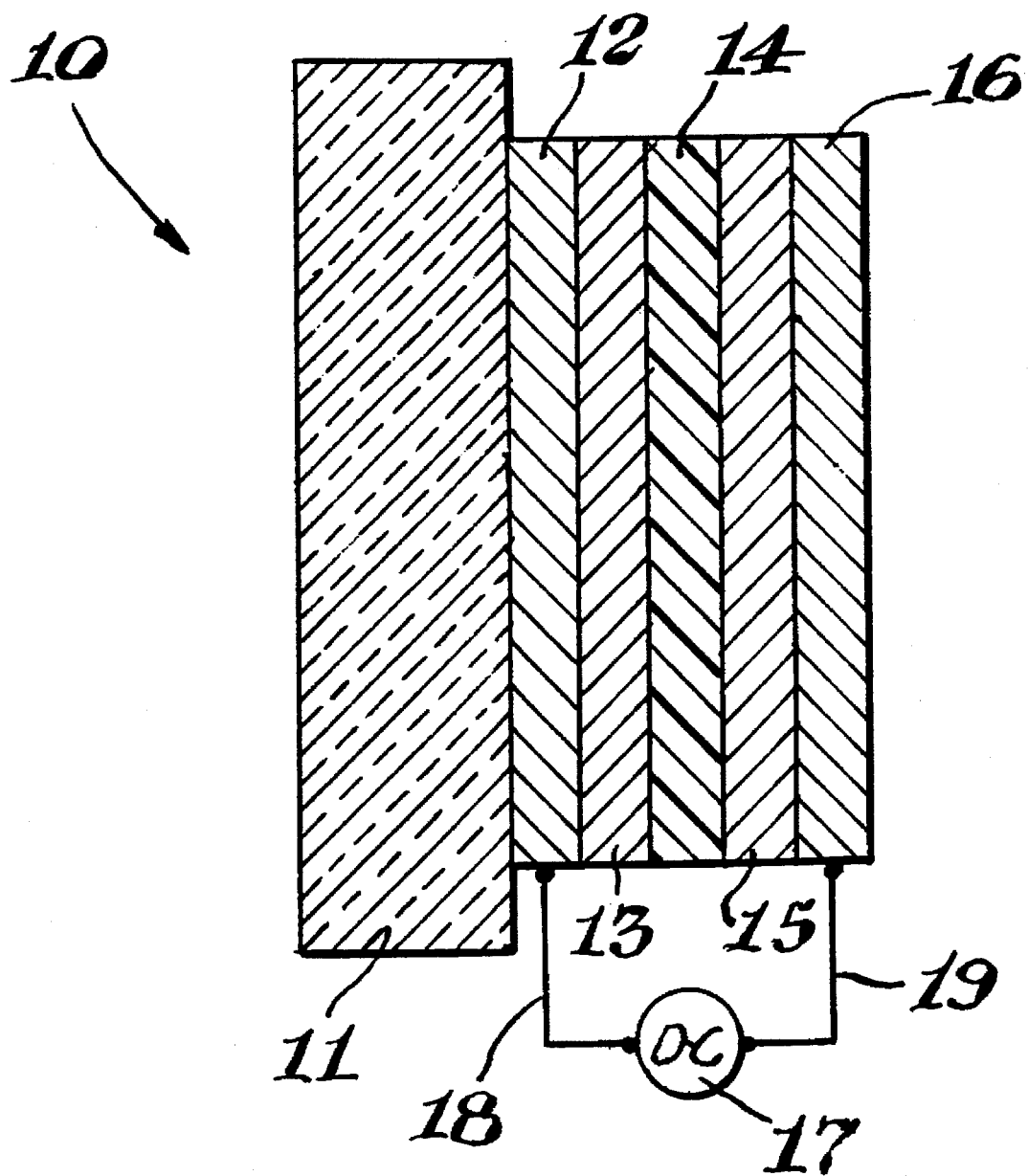
FIG. 1 is a cross sectional side view of a highly preferred improved electrochromic device according to the instant invention.

Referring now to FIG. 1, therein is shown a cross sectional side view of a highly preferred improved electrochromic device 10 according to the instant invention. The device 10 includes a panel of glass 11 having the following layers thereon: an electronically conductive 2,000 Angstrom thick transparent layer of indium tin oxide 12; a 6,000 Angstrom thick transparent layer of tungsten oxide 13; a 5 micrometer thick transparent layer of perfluorosulfonic acid polymer 14; a 400 Angstrom thick transparent layer of iridium oxide 15; and an electronically conductive 150 Angstrom thick transparent layer of gold 16. A 200 Angstrom thick transparent layer of titanium dioxide, not shown, can be applied to the layer of gold 16 as a protective and antireflection coating.

The layer of indium tin oxide 12 and the layer of tungsten oxide 13 form a cathodic electrochromic electrode as is well known in the art, e.g., U.S. Pat. No. 4,193,670 to Giglia et al. The layer of perfluorosulfonic acid polymer 14 is an ion conductor as is well known in the art, e.g., U.S. Pat. No. 5,124,080 to Shabrang and Babinec. The layer of iridium oxide comprises the improvement of the instant invention.

One terminal of a source of direct current electricity 17 is connected to the layer of indium tin oxide by a first wire 18. The other terminal of the source of direct current electricity 17 is connected to the gold layer 16 by a second wire 19. The device 10 is cycled to its relatively clear or to its relatively colored state depending on the polarity of the source of direct current electricity 17.

The electrochromic device 10 can be made according to the following procedure. Examples 1 and 2 of U.S. Pat. No. 5,136,419 are followed up to, but not including, the point where the gold layer is deposited. Then the iridium oxide layer 15 is deposited upon the perfluorosulfonic acid polymer layer by a sputtering technique using an etched iridium metal target in a reduced pressure oxygen atmosphere. Sputtering is a well known technique for forming thin films, see for example, Wasa et al., *Handbook of sputter deposition technology*, 1992, ISBN 0-8155-1280-5. Then the gold layer 16 is deposited on the iridium oxide layer 15 by a sputtering technique using a gold metal target in a reduced pressure argon atmosphere, i.e., using the same procedure as was used in the above mentioned U.S. Pat. No. 5,136,419 to put a gold layer upon a layer of perfluorosulfonic acid polymer. The gold layer 16 is about 150 angstroms thick.

A highly preferred sputtering condition for depositing the iridium oxide layer 15 is to use a target of iridium, a base pressure of less that 0.05 micrometers of mercury, an oxygen pressure of 10 micrometers of mercury, a sputtering gun power of 100 watts, and a target to substrate distance of about 12 centimeters for a 3 by 3 centimeter test device. Such a sputtering condition should result in an iridium oxide deposition rate of about 6 angstroms per second. A US II sputtering gun (Campbell, Calif.) can be used in a standard vacuum chamber. The iridium target can be obtained from the PureTech Company, Carmel, N.Y. Preferably, the iridium target is argon etched for thirty seconds prior to the sputtering operation.

Preferably, the thickness of the iridium oxide layer 15 is more than about 100 angstroms. More preferably, the thickness of the iridium oxide layer 15 is more than about 200 angstroms. Most preferably, the thickness of the iridium oxide layer 15 is about 400 angstroms. On the other hand, preferably, the thickness of the iridium oxide layer 15 is less than about 1000 angstroms. More preferably, the thickness of the iridium oxide layer 15 is less than about 600 angstroms. Most preferably the iridium oxide layer is perfectly level and even. However, when the iridium oxide layer is not perfectly level and even, then the thickness discussed above is the average thickness thereof.

Most preferably, the empirical formula of the freshly prepared iridium oxide layer 15 is $IrO_x$, where x in the range of from about 2.3 to about 2.7 as measured by the electron microprobe technique. In other words, the mole ratio of iridium to oxygen (Ir/O) as determined by the electron microprobe technique is most preferably in the range of from about 1/2.3 to about 1/2.7. The electron microprobe technique is well known in the art of chemical analysis, see e.g., Goldstein, *Practical Scanning Electron Microscopy—Electron and Ion Microprobe Analysis* (1975) ISBN 0-306-30820-7.

The preferred means of forming the iridium oxide layer is the sputtering technique described above. However, forming the iridium oxide layer by a sputtering technique is not critical in the instant invention. The iridium oxide layer can be formed by any other suitable technique. For example, a layer of gold can be sputtered onto a pane of glass and then a layer of iridium can be sputtered onto the layer of gold. Then, the iridium layer is oxidized to iridium oxide by the well known technique of repeated electrochemical oxidation and reduction in dilute sulfuric acid.

A highly preferred sputtering condition for depositing the gold layer 16 is to use a target of gold, a base pressure of less that 0.02 micrometers of mercury, an argon pressure of 10 micrometers of mercury, a sputtering gun power of 50 watts, and a target to substrate distance of about 12 centimeters for a 3 by 3 centimeter test device. A US II sputtering gun (Campbell, Calif.) can be used in a standard vacuum chamber. The gold target can be obtained from the PureTech Company, Carmel, N.Y. Preferably, the gold target is argon etched for thirty seconds prior to the sputtering operation.

The term electronic contact is used herein in its conventional meaning, e.g., the transference of electrical current from one material to another material. In FIG. 1 the iridium oxide layer 15 is in direct contact with the gold layer 16 so that there can be direct electronic contact between the iridium oxide layer 15 and the gold layer 16. However, it should be understood that there does not have to be direct physical contact between the iridium oxide layer 15 and the gold layer 16 as long as there is electronic conduction between the iridium oxide layer and the gold layer. For example, a layer of an electronically conducting material, such as a metal, can be positioned between the iridium oxide layer 15 and the gold layer 16 as long as electronic conduction between the iridium oxide layer 15 and the gold layer 16 is maintained.

The term ionic contact is also used herein in its conventional meaning, e.g., the transference of ions such as hydrogen ions ($H^+$) from one material to another material. In FIG. 1, the iridium oxide layer 15 is in direct contact with the ion conducting perfluorosulfonic acid polymer layer 14. It is theorized, without being bound thereby, that when the device 10 is colored, hydrogen ions are conducted from the iridium oxide layer 15 into the perfluorosulfonic acid polymer layer 14. These hydrogen ions are then conducted, it is theorized, without being bound thereby, through the perfluorosulfonic acid polymer layer 14 into the tungsten oxide layer 13 so that the tungsten oxide is converted into an intensely colored bronze. However, it should be understood that there does not have to be direct physical contact between the iridium oxide layer and the ionic conductor as long as there is ionic conduction between the iridium oxide layer and the ionic conductor. For example, a layer of an ionically conducting material, such as silicon dioxide, can be positioned between the iridium oxide layer and the ion conductor. It should also be understood that the instant invention is not limited or defined by the above mentioned theory. For example, the hydrogen ions can be at least partly replaced with lithium ions or sodium ions.

The term ion conductor is used herein in its conventional meaning, e.g., a solid or liquid material through which ionic conduction occurs. Preferably, in the instant invention the ion conductor is a relatively poor electronic conductor, e.g., the perfluorosulfonic acid polymer of U.S. Pat. No. 5,136,419, used in the hydrogen ion form or at least partially in a salt form such as the sodium ion form or especially the lithium ion form. Other ion conductors that have been used in prior art electrochromic devices and which can be used in the instant invention include, without limitation, poly 2-acrylamido-2-methylpropane sulfonic acid or salt, sulfonated polystyrene acid or salt, NAFION brand perfluorosulfonic acid polymer from DuPont (acid or salt), polyethylene oxide, p-toluene sulfonic acid or salt, sodium beta alumina, silicon dioxide, tantalum oxide and zirconium oxide as discussed, for example, by Jean-Paul Randin, *Ion Containing Polymers as Semi-Solid Electrolytes in Tungsten Oxide Based Electrochromic Devices*, J. Electrochem. Soc., 129(6), 1215–20 (1982) and by Carl M. Lampert, *Electrochromic Materials and Devices for Energy Efficient Windows*, Solar Energy Materials (1984).

The term cathodic electrochromic electrode is used herein in its conventional meaning, e.g., an electrode that transmits or reflects a noticeably decreased amount of light (an absorbency increase of more than 0.2 Absorbancy Units for visible light) when such electrode is made sufficiently negative relative to the counterelectrode. In the prior art of electrochromic devices one of the most used cathodic electrochromic electrodes is a layer of tungsten oxide on a layer of indium tin oxide. However, the use of tungsten oxide is not critical in the instant invention and other cathodic electrochromic materials can be used such as, without limitation, lithium tungsten oxide, niobium oxide, vanadium oxide, titanium dioxide, molybdenum oxide, heteropolytungstates, etc., see Carl M. Lampert, *Electrochromic Materials and Devices for Energy Efficient Windows*, Solar Energy Materials (1984) and U.S. Pat. No. 5,142,406 to Lampert et al., Column 3, line 49 to column 5, line 4.

Such electrochromic materials are often associated with an electrically conducting layer or current collector of indium tin oxide to complete the cathodic electrochromic electrode. However, other current collectors can be used in place of the indium tin oxide, such as a layer of gold or other means such as described in U.S. Pat. No. 5,142,406 to Lampert et al., Column 7, line 48 to column 8, line 3.

The term counterelectrode is used herein in its conventional meaning, e.g., an electrode which when paired with an electrochromic electrode via an ion conductor forms an electrochromic device. The counterelectrode of this invention must also not be an electrochromic electrode, i.e., the absorbancy of the counterelectrode must not change by more than 0.2 Absorbancy Units for visible light when the device of this invention is cycled from its colored state to its bleached state. Ordinarily, iridium oxide counterelectrodes would be expected to be electrochromic electrodes. However, the iridium oxide layers of this disclosure do not form electrochromic electrodes.

The device 10 of FIG. 1 is only one example of the instant invention. For example, a laminated glass device according to the instant invention can be made as follows. Examples 1 and 2 of U.S. Pat. No. 5,136,419 are followed up to, but not including, the point where the gold layer is deposited, i.e., including the formation of a layer of perfluorosulfonic acid polymer. A layer of gold is deposited upon a separate glass panel using the sputtering technique of U.S. Pat. No. 5,136,419. A layer of iridium oxide is deposited upon the layer of gold using the sputtering technique described above. The perfluorosulfonic acid polymer layer and the iridium oxide layer are wetted with the perfluorosulfonic acid polymer dispersion of Example 1 of U.S. Pat. No. 5,136,419 and then the two panes of glass are pressed together so that the perfluorosulfonic acid polymer dispersion bonds the perfluorosulfonic acid polymer layer to the iridium oxide layer to produce a laminated device according to the instant invention. Thus, in the broad scope of the instant invention the only critical limitation is that a layer of iridium oxide be positioned between the layer of gold and the ion conductor, the layer of iridium oxide being in direct or indirect ionic contact with the ion conductor, the layer of iridium oxide also being in direct or indirect electronic contact with the layer of gold and the layer of iridium oxide and the layer of gold not being an electrochromic electrode.

What is claimed is:

1. An improved electrochromic device of the type incorporating a cathodic electrochromic electrode in ionic contact with an ion conductor, the ion conductor being in ionic contact with a counterelectrode, the counterelectrode comprising a layer of gold, wherein the improvement comprises: a layer of iridium oxide, the layer of iridium oxide being positioned between the layer of gold and the ion conductor, the layer of iridium oxide being in ionic contact with the ion conductor, the layer of iridium oxide being in electronic contact with the layer of gold, the layer of iridium oxide and the layer of gold not being an electrochromic electrode.

2. The electrochromic device of claim 1, wherein the iridium oxide has an empirical formula of $IrO_x$, where x in the range of from about 2.3 to about 2.7.

3. The electrochromic device of claim 1, wherein the thickness of the layer of iridium oxide is in the range of from about 100 angstroms to about 1000 angstroms.

4. The electrochromic device of claim 1, wherein the thickness of the layer of iridium oxide is in the range of from about 200 angstroms to about 600 angstroms.

5. The electrochromic device of claim 1, wherein the iridium oxide has an empirical formula of $IrO_x$, where x is in the range of from about 2.3 to about 2.7 and wherein the thickness of the layer of iridium oxide is in the range of from about 100 angstroms to about 1000 angstroms.

6. The electrochromic device of claim 1, wherein the iridium oxide has an empirical formula of $IrO_x$, where x is in the range of from about 2.3 to about 2.7 and wherein the thickness of the layer of iridium oxide is in the range of from about 200 angstroms to about 600 angstroms.

7. The electrochromic device of claim 1, wherein the iridium oxide has an empirical formula of $IrO_x$, where x is in the range of from about 2.3 to about 2.7 and wherein the thickness of the layer of iridium oxide is about 400 angstroms.

* * * * *